No. 611,240. Patented Sept. 27, 1898.
A. C. ESTABROOK.
BRUSH.
(Application filed Sept. 7, 1895.)
(No Model.)
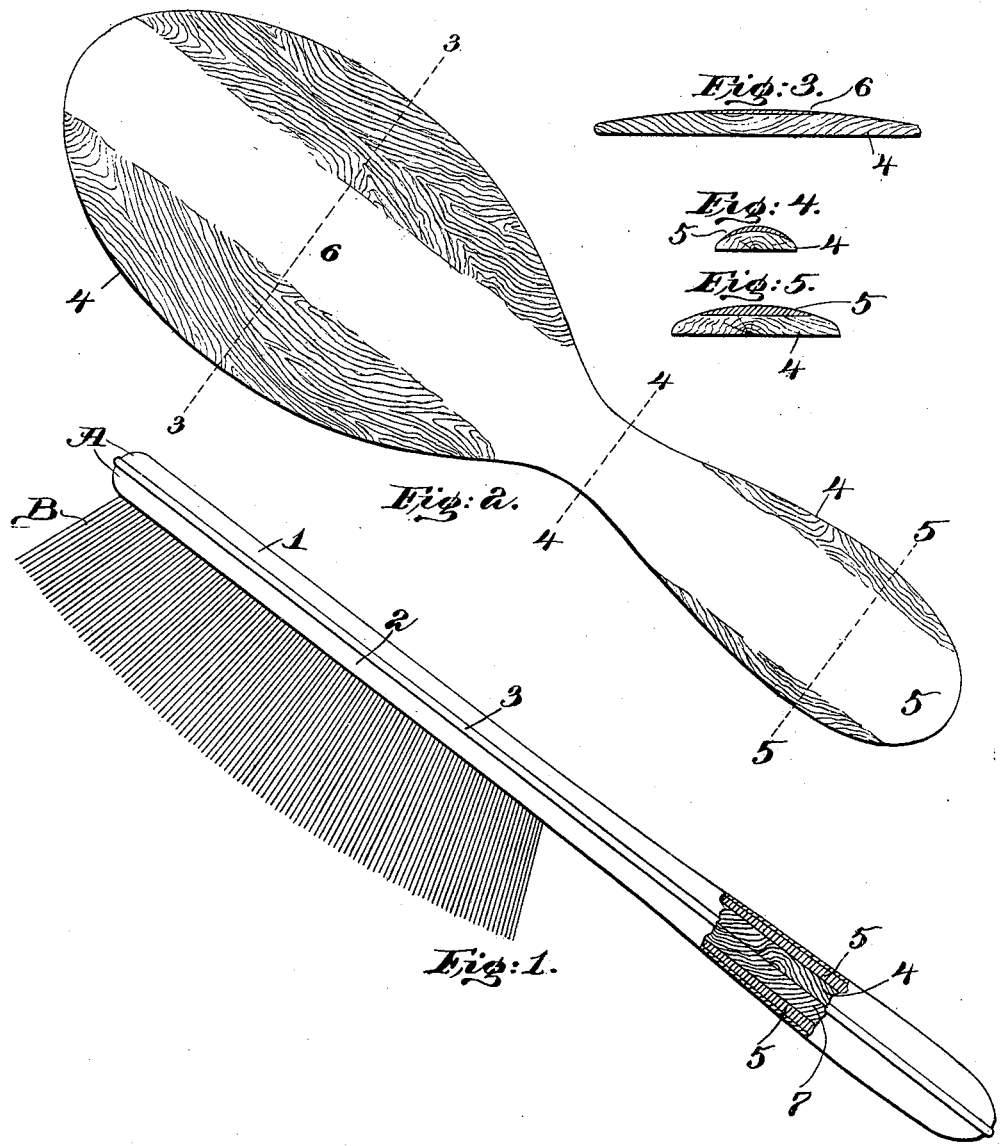
Witnesses:
Arthur H. Randall
Sheridan Ferree
Inventor:
Alanson C. Estabrook
by Macleod Calver & Randall
his Attorneys.
THE NORRIS PETERS CO., PHOTO-LITHO., WASHINGTON, D. C.

UNITED STATES PATENT OFFICE.

ALANSON C. ESTABROOK, OF NORTHAMPTON, MASSACHUSETTS.

BRUSH.

SPECIFICATION forming part of Letters Patent No. 611,240, dated September 27, 1898.

Application filed September 7, 1895. Serial No. 561,791. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Brushes, of which the following is a specification, reference being had therein to the accompanying drawings.
My invention relates more particularly to brushes in which the body is provided with a handle and is formed of two metallic shells reinforced interiorly by wood or similar material which is molded under pressure to the shape of the shell. In the manufacture of such brushes it is desirable to form a handle which is somewhat thicker than the remainder of the body of the brush—that is, a handle which is swelled or increased in thickness and which also is rounded. Such a handle is more easy and comfortable to grasp than one having only the thickness of the remainder of the body, and therefore is more desirable than a flat handle of the same thickness as the remainder of the backing, which is the character of handle that has been produced hitherto in the manufacture of brushes of the kind mentioned above. To so shape a wooden reinforce as to produce the enlargement and form which are required for the production of a swelled or rounded handle would greatly increase the cost of manufacture of the reinforce, which must be given approximately the shape of the interior of the shell and which in the case of a swelled or rounded handle would require to be thicker at the handle portion thereof than throughout the main portion of the body. There has been considerable difficulty experienced in the manufacture of the brushes aforesaid in causing the wooden reinforce to adhere firmly to the inner surface of the shell. When the reinforce loosens or frees itself from the shell, its advantages are largely lost, since the shell is then liable to be indented and loses its rigidity and stiffness.

My invention has for its object to facilitate the production of brushes of the kind above described, having swelled or rounded handles of greater thickness than the remaining portions of the bodies and having the reinforces firmly secured to the interior surface of the shells.

The invention is fully explained in the following description, with reference to the accompanying drawings, and its novel features are particularly pointed out and clearly defined in the claim which is appended to this specification.

In the following description reference is made to the accompanying drawings, in which—

Figure 1 is a view in side elevation of a brush embodying my invention, a portion of the handle being broken away to more clearly show the construction. Fig. 2 is a plan view of the reinforce for the upper shell of the brush-body. Fig. 3 is a view in section on line 3 3 of Fig. 2. Fig. 4 is a view in section on line 4 4 of Fig. 2. Fig. 5 is a view in section on line 5 5 of Fig. 2.

The body of the brush is shown at A, and the bristles at B. The body A is composed of two portions—namely, an upper or back shell 1 and a lower or face shell 2. The method of securing the bristles within the face-shell is not essential to my present invention and therefore will not be described.

The shells 1 and 2 usually are secured together by overlapping the flanges thereof, thereby forming a bead 3, Fig. 1; but the method of securing the shells together is unimportant, inasmuch as any well-known means of securing the shells together may be adopted. The shells 1 and 2 are formed to shape in well-known manner by means of dies, and in order to prevent indenting and render rigid the body of the brush and the handle thereof the entire cavity of the shell 1 should be reinforced, as also the cavity in the handle portion of the shell 2. The manner of reinforcing these portions is the important and essential characteristic of my present invention.

My method of reinforcing is as follows: To constitute a reinforce for shell 1, I prepare a piece of wood 4, of proper thickness, by forming it to the contour of the shell which it is to fill. The piece of wood employed is of uniform thickness, and therefore may be easily and quickly given the proper contour. As the handle of the brush is to be of increased thickness—that is, is to be swelled or rounded—I apply to the said reinforce, along and adjacent to the middle line thereof, a longitudinal strip 5 of plastic composition, which is adhesive when in a plastic condition and which will set and harden when cold. Any of the well-known compositions having these qualities may be employed. I place a larger quantity of this composition on the handle of the reinforce and especially longitudinally along the center thereof, the quantity of the composition employed depending upon the amount of swell which is desired in the handle. I also apply the composition longitudinally along the center of the back of the brush, as shown at 6, Figs. 2 and 3. A coating of shellac is then applied to the interior of the shell 1, which is placed in a die, and the reinforce is then laid within the cavity of the said shell, the cement or composition being between the wooden portion of the reinforce and the shell. Pressure is then applied, and the composition, as well as the wooden reinforce, are molded to fit the interior cavity of the shell. The plastic composition serves more perfectly to fill the shell than is possible when wood alone is employed, and by using a suitable quantity of plastic composition in the handle the swell or bulge of the handle may be entirely filled and a handle of any thickness may be produced. In this way also ornamental figures or the like which are struck up in the shell may be fully reinforced, the cavity inside the figure in the interior of the shell being filled with plastic composition.

The method of reinforcing the under side of the handle—that is, the handle portion of the shell 2—is the same as that above described for reinforcing the shell, all except that the wooden reinforce 7 of the said handle portion of the shell 2 does not extend forward of the shank of the handle. The other portion of said shell 2—that is, the portion in which the bristles are placed—is sufficiently reinforced by the cement or other means commonly employed for securing the bristles in place.

The employment of a mass of composition between the wooden reinforce and the interior surface of the shell not only serves to completely fill the shell and prevent it from becoming indented, but also causes the wooden reinforce to adhere much more firmly to the shell than with the employment of any ordinary adhesive. The plastic composition is itself an adhesive when in a plastic condition and so completely fills the shell and conforms to each portion of its surface that the maximum adhesive property of the material is fully utilized.

What I claim is—

A brush having a handle of greater thickness than the body thereof, and comprising two metallic shells, bristles inserted in one of said shells and secured therein, a wooden reinforce of uniform thickness contained within the other of said shells, substantially filling said shell and having its surface cemented to the inner surface of said shell, and a strip of plastic composition extending lengthwise along and adjacent to the middle line of said reinforce, and molded to fit the interior contour of the adjacent portions of the shell, whereby it assists in connecting the reinforce to the shell and gives to the reinforce enlargements fitted to the interior enlargements of the shell, as and for the purposes set forth.

In testimony whereof I affix my signature in presence of two witnesses.

ALANSON C. ESTABROOK.

Witnesses:
WM. A. MACLEOD,
CHAS. F. RANDALL.